(12) United States Patent
Takamiya et al.

(10) Patent No.: US 6,259,531 B1
(45) Date of Patent: Jul. 10, 2001

(54) DISPLACEMENT INFORMATION MEASURING APPARATUS WITH HYPERBOLIC DIFFRACTION GRATING

(75) Inventors: Makoto Takamiya, Tokyo; Hidejiro Kadowaki, Yokohama; Kou Ishizuka, Omiya; Yasushi Kaneda, Utsunomiya, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/333,043

(22) Filed: Jun. 15, 1999

(30) Foreign Application Priority Data

Jun. 16, 1998 (JP) .................................................. 10-185679

(51) Int. Cl.⁷ ...................................................... G01B 9/02
(52) U.S. Cl. ........................................ 356/499; 250/237 G
(58) Field of Search .................................... 356/356, 354, 356/28.5, 499, 521; 250/231.14, 237 G

(56) References Cited

U.S. PATENT DOCUMENTS

| 4,912,320 | 3/1990 | Ishii et al. . |
| 5,021,649 | 6/1991 | Nishimura et al. . |
| 5,066,130 | 11/1991 | Tsukiji et al. . |
| 5,067,089 | 11/1991 | Ishii et al. . |
| 5,327,222 | 7/1994 | Takamiya et al. ................ 356/356 |
| 5,621,527 | * 4/1997 | Kaneda et al. .................... 356/356 |

FOREIGN PATENT DOCUMENTS

| 0 510 750 | 10/1992 | (EP) . |
| 0 643 286 | 3/1995 | (EP) . |
| 60-243583 | 12/1985 | (JP) . |
| 62-154623 | 7/1987 | (JP) . |

* cited by examiner

Primary Examiner—Samuel A. Turner
(74) Attorney, Agent, or Firm—Fitzpatrick, Cella, Harper & Scinto

(57) ABSTRACT

An apparatus for detecting the displacement information of an object has a light source, a diffraction grating for diffracting a light beam from the light source so that the light beam diffracted by the diffraction grating is incident on the object, and a photodetector for detecting the light from the object caused upon the incidence of the light beam thereon by the diffraction grating. Information regarding the relative displacement to the object along a predetermined direction is detected on the basis of a light detection signal from the photodetector. The diffraction grating is formed so that the light beam applied to the object may be condensed on the object in a direction in which the relative displacement to the object cannot be detected by the signal from the photodetector.

14 Claims, 7 Drawing Sheets

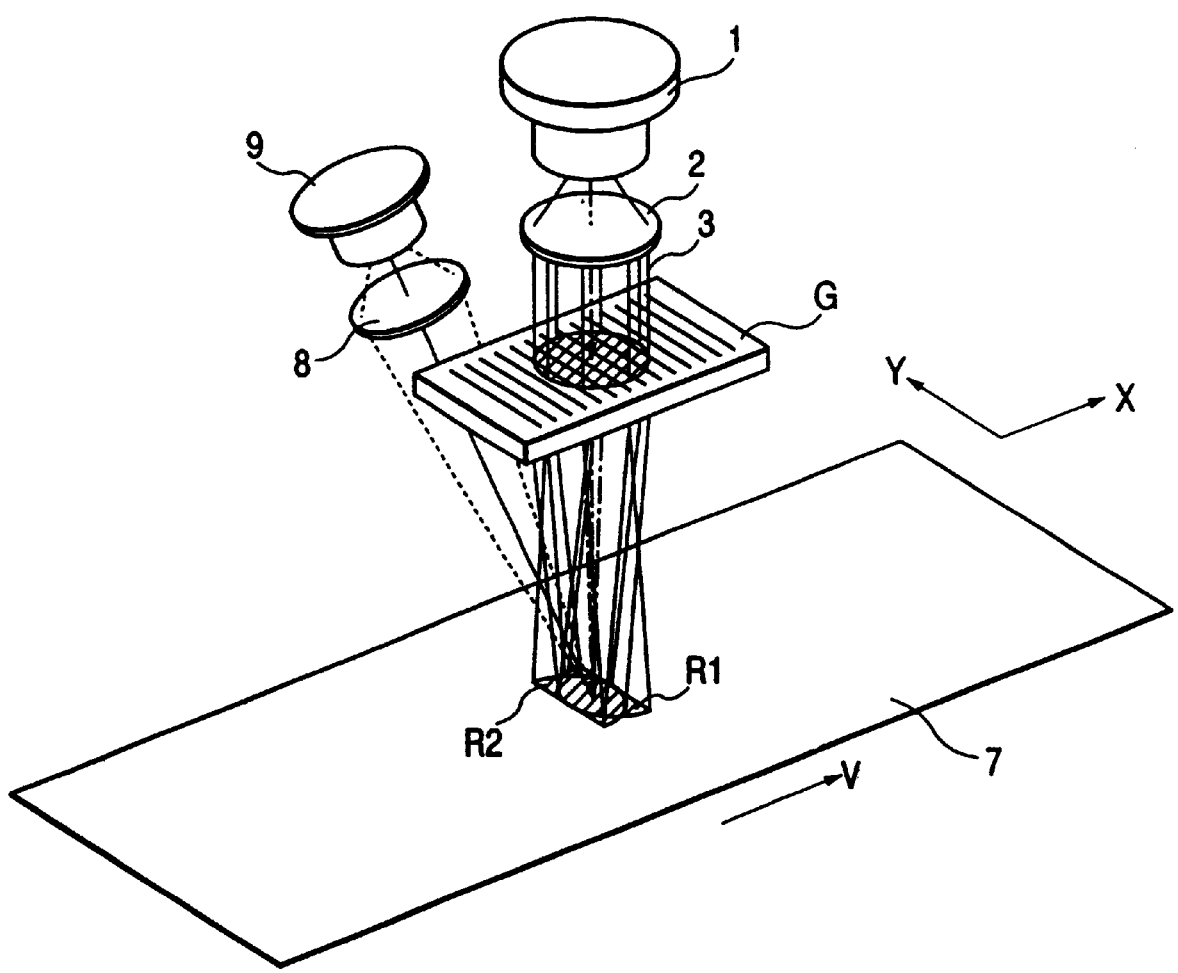

DISPLACEMENT INFORMATION MEASURING APPARATUS WITH HYPERBOLIC DIFFRACTION GRATING

BACKGROUND OF THE INVENTION

1. Field of the Invention

This invention relates to a displacement information measuring apparatus and can be well applied to a velocimeter utilizing the Doppler effect of applying a laser beam, for example, to a moving object or fluid or the like (hereinafter referred to as the "moving object") and detecting the shift of the frequency of scattered light subjected to Doppler shift in conformity with the movement velocity of the moving object to thereby measure the amount of displacement as the information regarding the displacement of the moving object or the movement velocity or the like of the moving object in non-contact.

2. Related Background Art

A laser Doppler velocimeter has heretofore been used as an apparatus for measuring the movement velocity of a moving object in non-contact and highly accurately. The laser Doppler velocimeter is an apparatus for applying a laser beam to a moving object, and measuring the movement velocity of the moving object by utilizing the effect (Doppler effect) of the frequency of scattered light from the moving object shifting in proportion to the movement velocity of the moving object. moving object.

FIG. 1A of the accompanying drawings is an illustration showing an example of the laser Doppler velocimeter according to the prior art.

In FIG. 1A, a laser beam emitted from a laser 1 becomes a parallel light beam 3 by a collimator lens 2, and is divided into two light beams, i.e., transmitted light 5a and reflected light 5b, by a beam splitter 4, and these two light beams are reflected by reflecting mirrors 6a and 6b, whereafter they are applied to a moving object 7 moving at a velocity B at a angle of incident θ from different directions. The scattered light from the moving object 7 is detected by a photodetector 9 through a converting lens 8. At this time, the frequencies of the scattered lights by the two light beams are subjected to the Doppler shifts of +Δf and −Δf in proportion to the movement velocity V. Here, if the wavelength of the laser beam is λ, the change Δf in the frequency can be expressed by the following expression (1):

$$\Delta f = V \cdot \sin(\theta)/\lambda \tag{1}$$

The scattered lights subjected to the doppler shifts of +Δf and −Δf interfere with each other and bring about a change of bright and dark on the light receiving surface of the photodetector 9, and the frequency F thereof is given by the following expression (2):

$$F = 2 \cdot \Delta f = 2 \cdot V \cdot \sin(\theta)/\lambda \tag{2}$$

If the frequency F of the photodetector 9 (hereinafter referred to as the "doppler frequency) is measured from expression (2), the movement velocity V of the moving object 7 will be obtained.

A method of improving the S/N ratio of a signal in such a velocimeter is proposed, for example, Japanese Patent Application Laid-Open No. 60-243583. In this publication, there is shown a method of condensing a laser beam applied to a moving object in a non-sensitive direction in velocity detection. Particularly, a cylindrical lens is disclosed as means for condensing a laser beam in a non-sensitive direction in velocity detection.

When in the prior-art velocimeter, a laser beam is to be condensed in the non-sensitive direction in velocity detection by the use of a cylindrical lens, the optical axes of two light beams and the generating-line optical axis of the cylindrical lens must be put together and the assembly must be done strictly. Also, as a matter of course, the number of parts increases correspondingly to the use of the cylindrical lens, and the entire apparatus becomes complicated.

FIG. 1B of the accompanying drawings shows an example of a laser Doppler velocimeter using an optical system which achieves the downsizing of the entire apparatus.

Referring to FIG. 1B, a laser beam emitted from a laser 1 becomes a parallel light beam 3 by a collimator lens 2, and enters a diffraction grating G having a grating pitch d. ±first-order diffracted lights R1 and R2 are created by the diffraction grating G, and emerge at a diffraction angle 6 which satisfies the relation that d·sin(θ)=λ. when the two light beams are applied to an object to be measured moving at a velocity V at an angle θ of incidence, the scattered light therefrom is detected by a photodetector 9 through a condensing lens 8, and like expression (2), the beat frequency F becomes $$F = 2 \cdot V \cdot \sin(\theta)/\lambda.$$

Here, the angle of incidence θ is equal to the angle of diffraction θ and therefore, there is established the relation that $$d \cdot \sin(\theta) = \lambda, \tag{3}$$

where d is the pitch of the diffraction grating.

From expressions (2) and (3), there is derived the following expression free of the dependency on the wavelength λ:

$$F = 2 \cdot V/d \tag{4}$$

From this, the movement velocity V is found.

By the construction as described above, a construction most compact up to now and free of the wavelength dependency of the laser beam, that is, a construction which eliminates the temperature dependency of a sensor, is made possible.

However, downsizing and low price can be achieved even by the construction as shown in FIG. 1B, but in the case of characteristic which produces not only desired ±first-order diffracted lights but also much of unnecessary O-order diffracted light, for example, by the level difference working error or the like of a diffraction grating, there results an interference signal including not the interference between ±first-order diffracted lights, but O-order diffracted light, and there has been a case where it is impossible to maintain the S/N of the Doppler signal shown in expression (4) good and the detection accuracy is aggravated.

SUMMARY OF THE INVENTION

It is an object of the present invention to provide a displacement information measuring apparatus in which optical parts such as a cylindrical lens, etc. need not be increased and a signal of good S/N can be obtained by a simple construction to thereby obtain highly accurate displacement information.

Other object of the present invention will become apparent from the following detailed description of some embodiments of the invention.

BRIEF DESCRIPTION OF THE DRAWINGS

FIG. 1B is an illustration of a laser Doppler velocimeter according to the prior art.

DESCRIPTION OF THE PREFERRED EMBODIMENTS

Figure 1A:
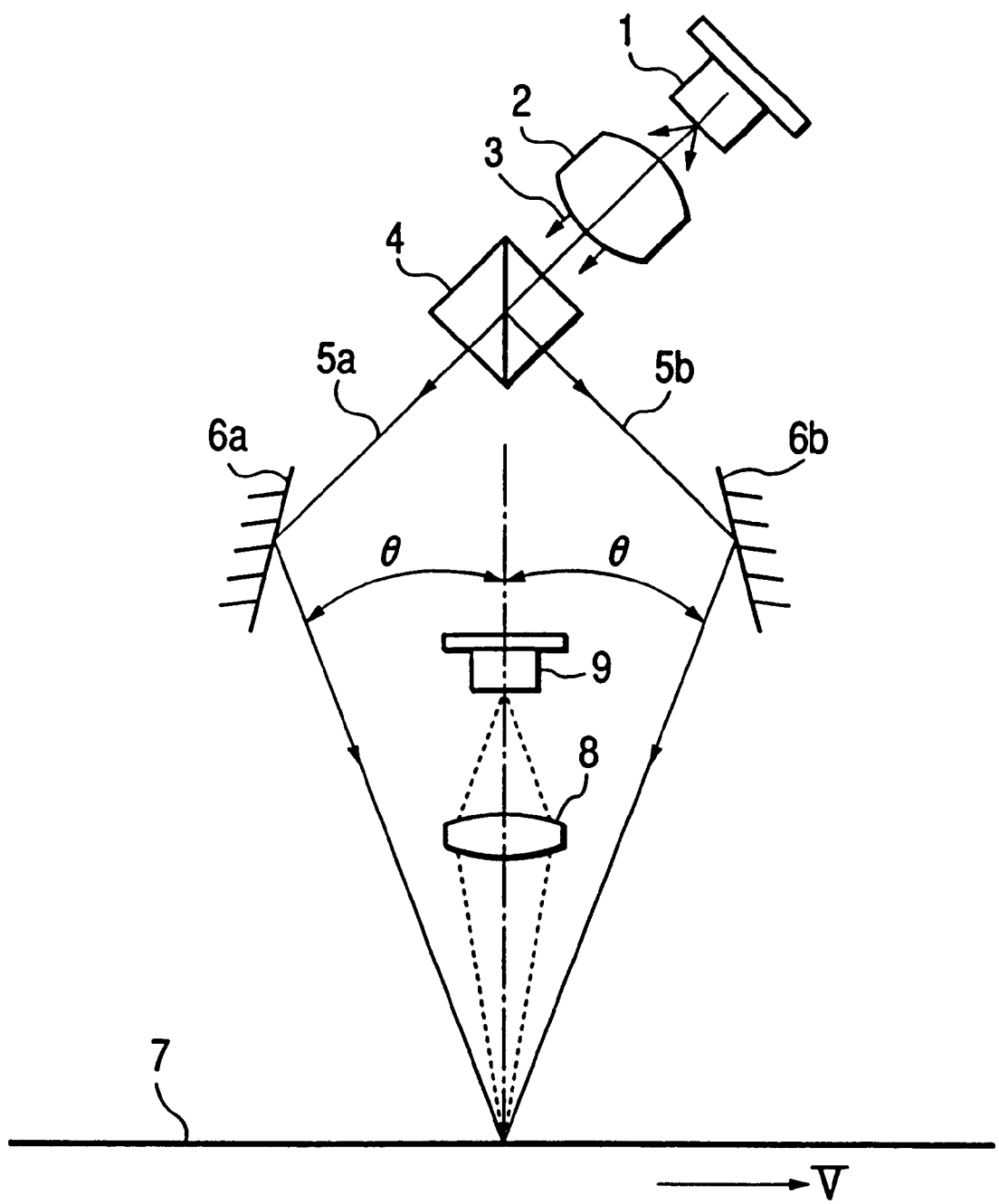
FIG. 1A is an illustration of a laser Doppler velocimeter according to the prior art.
Figure 2:
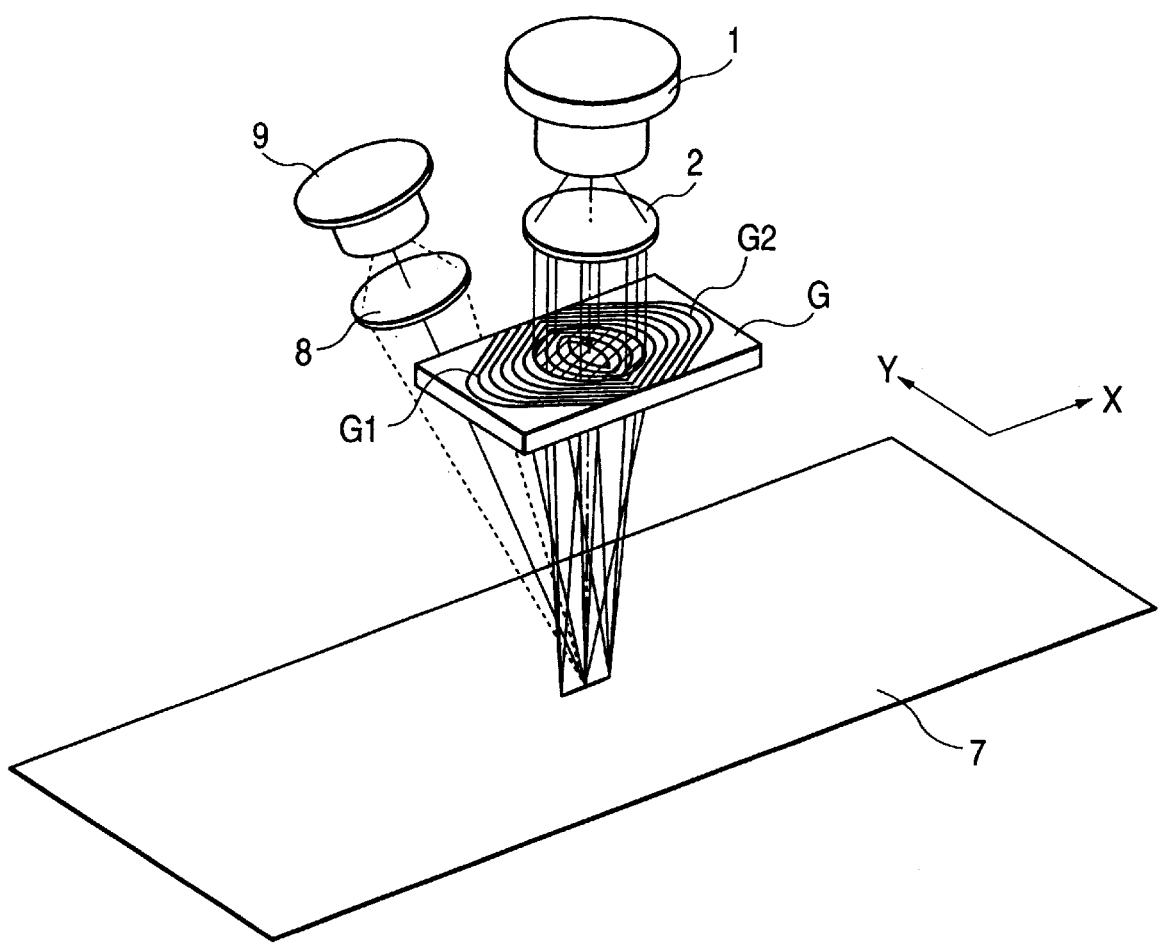
FIG. 2 is a perspective view of the essential portions of Embodiment 1 of the present invention.
Figure 3A:
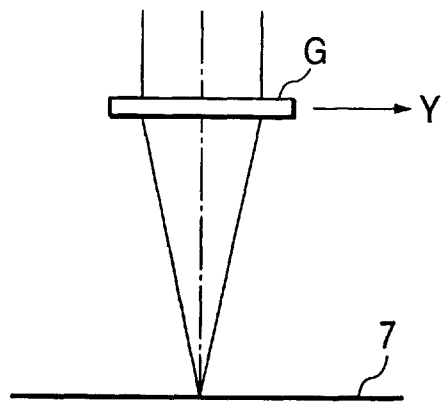
FIGS. 3A and 3B are illustrations of a portion of FIG. 2.
Figure 3B:
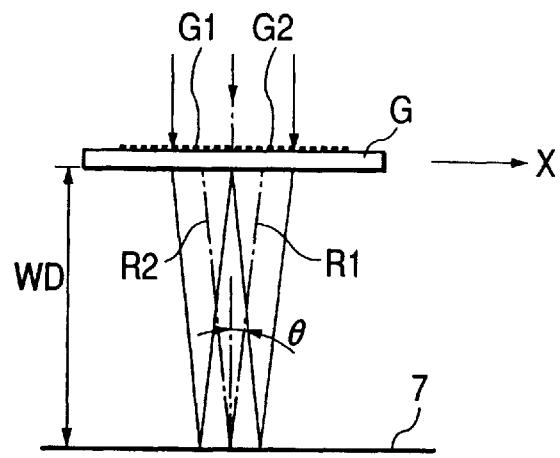

FIG. 2 is a perspective view of the essential portions of Embodiment 1 of the present invention, FIG. 3A shows rays of light as seen along the X-axis of FIG. 2, and FIG. 3B shows rays of light as seen along the Y-axis of FIG. 2.

This embodiment achieves an improvement in the S/N ratio of a Doppler signal without increasing optical parts, and is characterized in that a diffraction grating is used as deflecting means for making a light enter a moving object at a predetermined angle of incidence θ at a predetermined position and that the shape of the diffraction grating is formed so that the laser beam applied to the moving object may be condensed in a non-sensitive direction in velocity detection.

As a specific shape, gratings of the same hyperbolic shape are formed at the same pitch to thereby optically improve the S/N ratio of a detection signal.

Also, as deflecting means for deflecting a parallel light beam, diffraction gratings in which gratings of the same hyperbola are formed at the same pitch in a measurement detecting direction (X direction) are arranged in opposed relationship with each other, whereby it is not necessary to add optical parts and downsizing is realized and yet the S/N ratio of the detection signal is optically improved.

In FIGS. 2, 3A and 3B, a laser beam emitted from a laser 1 becomes a parallel light beam 3 by a collimator lens 2 and enters a blazed type diffraction grating (grating portion) G comprising a diffraction grating G1 having diffraction gratings of a hyperbolic shape arranged at a pitch d and a diffraction grating G2 disposed line-symmetrically with the diffraction grating G1 with respect to the Y-axis perpendicularly thereto, and ±first-order diffracted light R1 and diffracted light R2 are created by the diffraction gratings G1 and G2, respectively. These diffracted lights are kept as parallel light beams in a velocity detecting direction, but emerge so as to be converged at a measuring position in a non-sensitive direction (Y-axis) in velocity detection.

The diffraction grating G1 and G2 together constitute an element of deflecting means by which a laser beam is incident on a moving object 7 from a predetermined direction.

Figure 4:
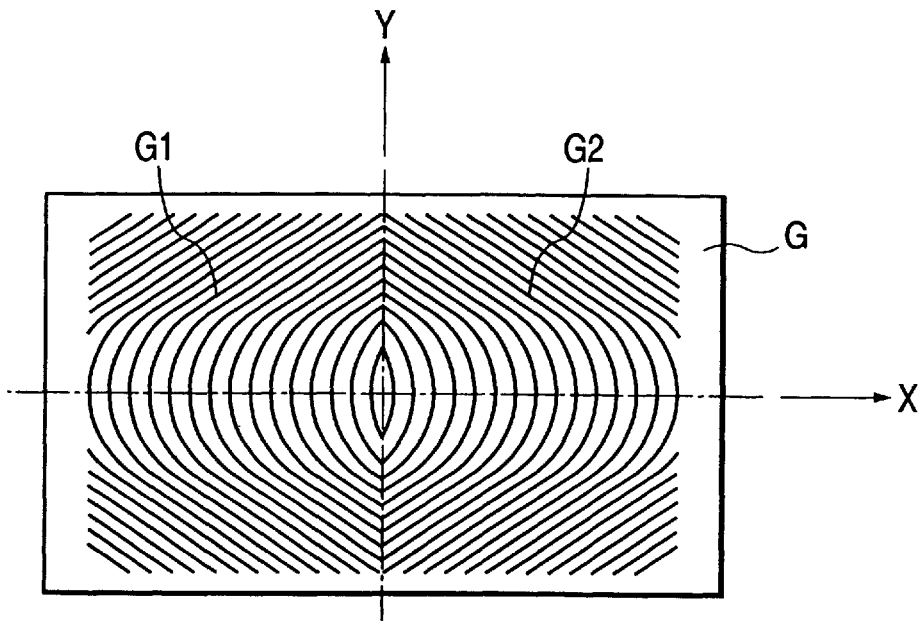
FIG. 4 is an illustration of a portion of FIG. 2.

FIG. 4 is an illustration showing the diffraction grating shape of the diffraction grating G1 of a hyperbolic shape will now be described. When the distance from the diffraction grating G1 to the object surface 7 to be measured is defined as WD, the hyperbolic shape is represented by the following expression:

$$\frac{(x + WD/\tan\theta)^2}{(WD/\tan\theta)^2} - \frac{y^2}{WD^2} - 1 = 0$$

When a parallel light beam enters the diffraction grating G1, diffracted light emerges at an angle of diffraction θ which satisfies d·sin (θ)=λ in the direction of the X-axis. Meanwhile, in the direction of the Y-axis, the light beam is converged at a position with the distance WD which is a distance from the diffraction grating G1 to the object surface to be measured. It should be noted that d is the pitch of the diffraction grating.

When the parallel light beam from the laser 1 enter both (diffraction grating G) of the diffraction grating G1 and the diffraction grating G2 disposed in opposed relationship therewith, it becomes possible to condense the laser beam in the non-sensitive direction (Y direction) in velocity detection on the surface 7 to be measured, as shown in FIGS. 2 and 3A.

When the two light beams R1 and R2 are applied at an angle of incidence θ to the object 7 to be measured moving at a velocity V, the scattered light therefrom is detected by a photodetector 9 through a condensing lens 8, and regarding the beat frequency F thereof, similarly to expression (4), the relation that $$F=2·V/d \qquad (5)$$

is established, and there is derived an expression free of the wavelength dependency of the laser beam.

In FIG. 4, there is shown an example in which the angle of incidence of the laser beam onto the diffraction grating G is perpendicular, by when the angle of incidence of the laser beam changes, the optimum hyperbolic shape changes. When an angle of incidence is given to the laser beam, the hyperbolic shape can be optimally designed so as to condense the laser beam in the non-sensitive direction in velocity detection on the surface to be measured.

Figure 5:
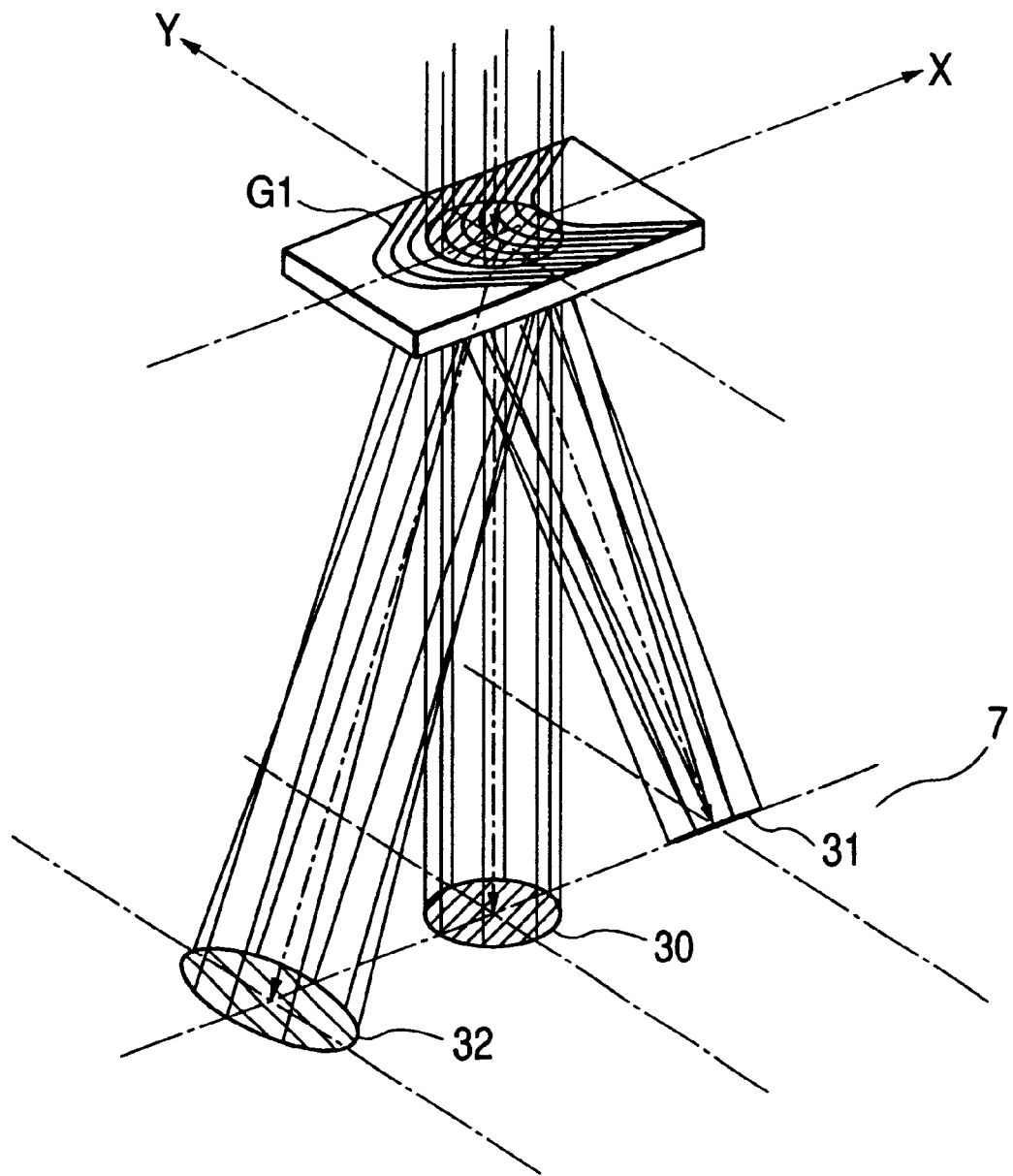
FIG. 5 is a view illustrating the expanse of each order diffracted light from a diffraction grating.

FIG. 5 is a view illustrating the velocity of diffracted light of each order on the object surface 7 to be measured when a parallel light beam is applied to the diffraction grating G. As can be seen from this figure, +1st-order diffracted light 31 necessary for the detection of the velocity is converged with respect to the non-sensitive direction (Y-axis) in velocity detection, and 0-order diffracted light 30 remains being parallel light beam with respect to the direction of the Y-axis, and −1st-order diffracted light 32 becomes divergent with respect to the non-sensitive direction (Y-axis) in velocity detection.

Generally the diffraction grating is designed such that 0-order light is not created, but even when 0-order light is created, the density of the light is small correspondingly to the percentage of the width of the light beam to the Y-axis and thus, the percentage of an unnecessary interference component which is a noise component becomes finally negligible.

In the present embodiment, by the construction as described above, there is obtained a signal of which the S/N ratio is improved without the number of parts being increased. Also, a cylindrical lens is not used and therefore, it is not necessary to align the optical axes of the two light beams with the generating-line of the cylindrical lens during assembly, and throw-in assembly is made possible.

Also, the degree of influence of the unnecessary interference light attributable to inaccuracy of manufacturing is greatly curtailed, whereby any irregularity of performance can also be greatly curtailed.

Figure 6:
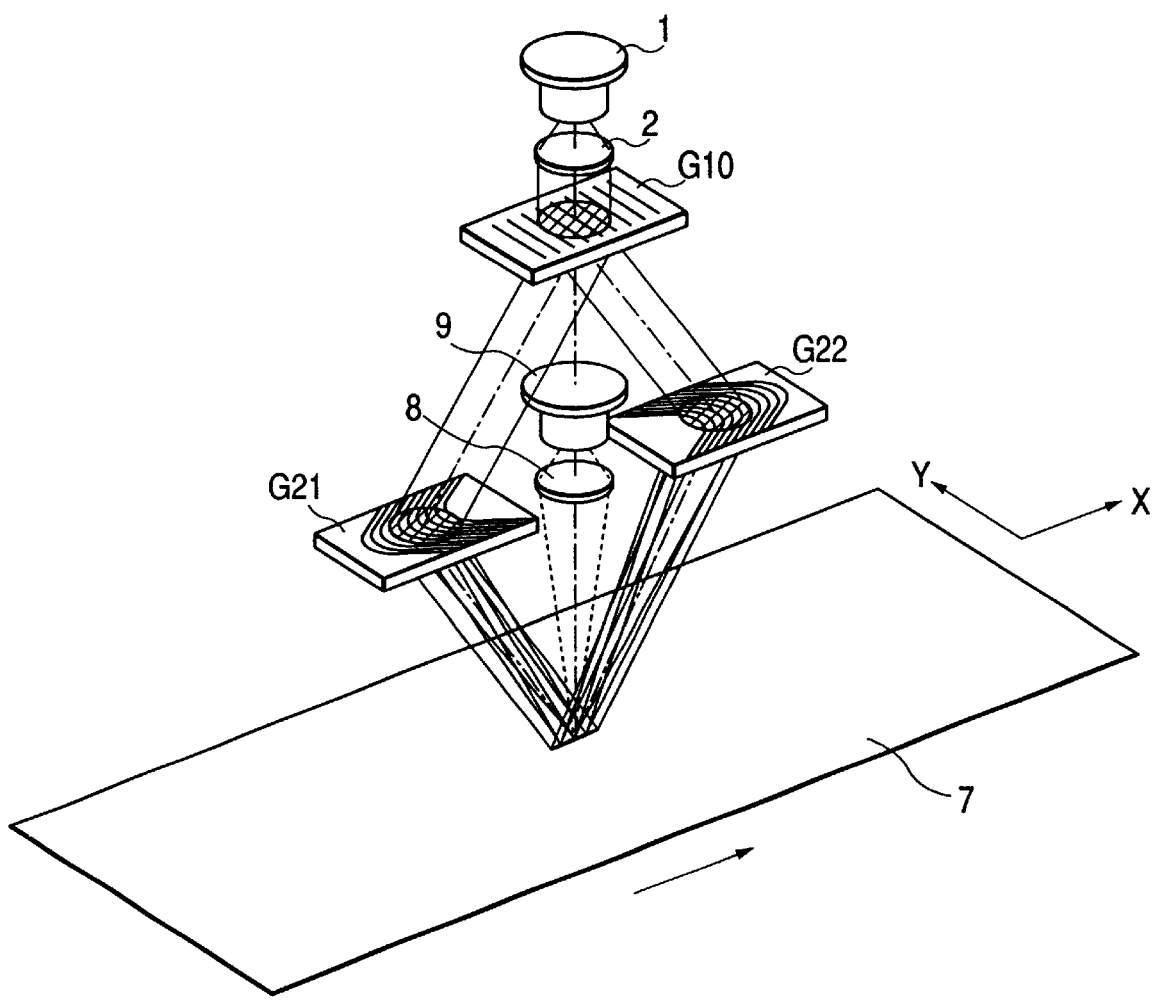
FIG. 6 is a perspective view of the essential portions of Embodiment 2 of the present invention.

FIG. 6 is a perspective view of the essential portions of Embodiment 2 of the present invention. In FIG. 6, a laser beam from a laser 1 is made into a parallel light beam by a collimator lens 2 and enters a first linear diffraction grating G10 of a grating pitch d. The incident light is split into two beams by the linear diffraction grating G10. Second diffraction gratings G21 and G22 in which hyperbolic shapes are arranged at a grating pitch d/2 have their hyperbolic shapes disposed in opposed relationship with each other and so that the light may be converged on an object surface 7 to be measured in a non-sensitive direction (Y direction) in velocity detection.

The first diffraction grating G10 and the second diffraction gratings G21, G22 together constitute an element of deflecting means.

When in the present embodiment, the distance from the second diffraction gratings G21, G22 to the object surface 7 to be measured is defined as WD, the hyperbolic shape of the second diffraction gratings G21, G22 is represented by the following expression:

$$\frac{\{x + WD(1 - \sin\theta)^2/(2\sin\theta\cos\theta)\}^2}{\{WD(1 - \sin\theta)^2/(2\sin\theta\cos\theta)\}^2} - \frac{y^2}{WD^2} - 1 = 0$$

The +1st-order and −1st-order diffracted lights from the diffraction gratings G21 and G22 are scattered by the object 7 to be measured, and the scattered light is detected by a photodetector 9 through a condensing lens 8. As in Embodiment 1, displacement information V is obtained from expression (4).

While in this embodiment, an example in which the diffraction grating G10 is used as a beam splitter is mentioned, the effect of the present invention can also be obtained by an optical system comprising a combination of a half mirror and a prism.

Figure 7:
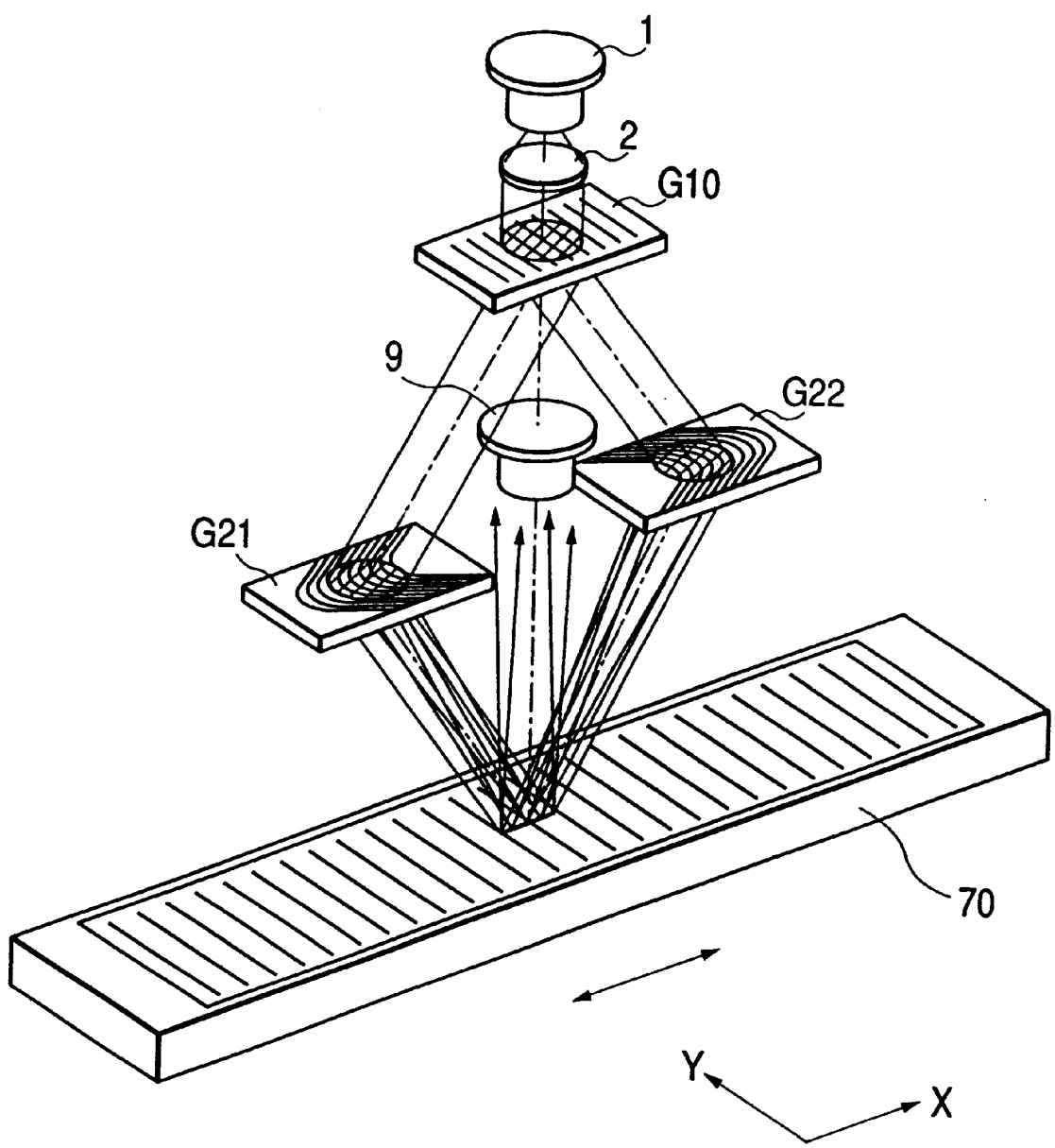
FIG. 7 is a perspective view of the essential portions of Embodiment 3 of the present invention.

FIG. 7 is a perspective view of the essential portions of Embodiment 3 of the present invention. This embodiment shows a linear encoder. The construction in which a light beam from a laser 1 is made into a parallel light beam by a collimator lens 2 and is made to enter an object 7 to be measured by a first diffraction grating G10 and second diffraction gratings G21, G22 is the same as Embodiment 2 of FIG. 6.

In the present embodiment, a scale 70 comprising a reflecting type diffraction grating of a grating pitch d is used as the object surface to be measured. In this case, a photodetector 9 receives scattered light concentrating in a particular direction created by the diffracted lights from the diffraction gratings G21 and G22 entering the reflecting type diffraction grating 70, i.e., the interface light of the diffracted lights. The present construction is an optical system for increasing the mounting tolerance, and without a cylindrical lens being disposed, the light beam can be made into a condensed light beam by the scale surface 70, and this construction is excellent in downsizing and assembling property.

This diffraction grating 70 may be of a transmitting type. In this case, the photodetector is disposed under the scale 70 of FIG. 7.

Also, the first diffraction grating G10 may be replaced by a prism type beam splitter. If for example, this beam splitter is made into a polarizing beam splitter having its polarization axis inclined by 45° with respect to the linearly polarized direction of the incident laser beam, and a λ/4 plate and another polarizing beam splitter are disposed in the optical path of the emergent light beam from the scale 70 and each of the light beams split by the another polarizing beam splitter is designed to be received by a photodetector, signals having a phase shift of 90° with each other (so-called two-phase signals) will be obtained from the two photodetectors.

In the present embodiment, there is shown a case shape are formed at the same pitch, as the shape of the diffraction grating for condensing the laser beam in the non-sensitive direction (Y direction) in velocity detection, but the central portion of the Y-axis of the hyperbolic shape substantially coincides with a circular shape and therefor, when the effective beam diameter is sufficiently small, the hyperbolic shape approximately includes an arcuate shape.

As described above, a diffraction grating is used as deflection means for making light enter a moving object, and the shape of the diffraction grating is formed so that the light beam applied to the moving object may be condensed in a non-sensitive direction in velocity detection, whereby without increasing optical parts such as a cylindrical lens, etc., there can be achieved a displacement information measuring apparatus which can obtain a signal of good S/N and can obtain highly accurate displacement information by a simple construction.

What is claimed is:

1. An apparatus for detecting displacement information of an object including:

a light source unit;

deflecting means for deflecting a light beam from said light source unit so that the light beam deflected by said deflecting means is incident on said object; and a photodetector for detecting the light from said object caused upon the incidence of the light beam thereon by said deflecting means, information regarding the relative displacement to said object along a predetermined direction being detected on the basis of a light detection signal from said photodetector;

wherein said deflecting means includes a diffraction grating for diffracting the light beam to be incident on said object, said diffraction grating being formed so that substantially only one predetermined order diffraction light beam applied to said object may be condensed on said object in a direction in which the relative displacement to said object cannot be detected by the signal from said photodetector.

2. An apparatus according to claim 1, wherein said diffraction grating is formed such that gratings of the same hyperbolic shape are arranged at a given pitch in said predetermined direction.

3. An apparatus according to claim 1, wherein said object is a scale having a diffraction grating.

4. An apparatus according to claim 1, wherein said diffraction grating is a blazed type diffraction grating.

5. An apparatus for detecting the displacement information of an object including:

a light source unit;

deflecting means for deflecting a light beam from said light source unit so that the light beam deflected by said deflecting means is incident on said object; and a photodetector for detecting the light from said object caused upon the incidence of the light beam thereon by said deflecting means, information regarding the relative displacement to said object along a predetermined direction being detected on the basis of a light detection signal from said photodetector;

wherein said deflecting means includes a diffraction grating unit for diffracting said light beam to be incident on said object, said diffraction grating unit having two grating rows in which gratings of the same hyperbolic shape arranged at a given pitch in said predetermined direction are disposed in opposite directions.

6. An apparatus according to claim 5, wherein said two grating rows are formed so that said light beam may be condensed on said object in a direction in which the relative displacement to said object cannot be detected by the signal from said photodetector.

7. An apparatus according to claim 6, wherein when the light beam to be incident on said diffraction grating unit is a parallel light beam and said predetermined direction is the direction of the X-axis and the direction in which the relative displacement to said object cannot be detected by the signal from said photodetector is the direction of the Y-axis and the distance from said diffraction grating unit to said object is defined as WD and the angle of diffraction in the direction of said X-axis by said diffraction grating is defined as $\theta$, the hyperbola of one of said two grating rows is represented by the following expression:

$$(x+WD/\tan\theta)^2/(WD/\tan\theta)^2 - y^2/WD^2 - 1 = 0.$$

8. An apparatus according to claim 5, wherein said object is a scale having a diffraction grating.

9. An apparatus according to claim 5, wherein said two grating rows are comprised of a blazed type diffraction grating.

10. An apparatus according to claim 5, wherein said two grating rows are formed on the same substrate.

11. An apparatus according to claim 5, further including a dividing diffraction grating for dividing the light beam from said light source unit, respective ones of said two grating rows being disposed so as to deflect the corresponding ones of two light beams divided by said dividing diffraction grating.

12. An apparatus for detecting the displacement information of an object including:
a light source unit;
a diffraction grating for deflecting a light beam from said light source unit, of a shape in which at least the same hyperbolic grating are arranged at a given pitch in a predetermined direction; and
a photodetector detecting the light from said object caused when the light beam deflected by said diffraction grating and having a linearly converged state extending in said predetermined direction is incident on said object, information regarding the relative displacement to said object along said predetermined direction being detected on the basis of a light detection signal from said photodetector.

13. An apparatus according to claim 12, wherein said diffraction grating has two grating rows in which the same hyperbolic gratings arranged at a given pitch in said predetermined direction are disposed in opposite directions.

14. An apparatus according to claim 12, wherein when said predetermined direction is the direction of the x-axis and a direction perpendicular to both of the direction opposed to said object and said predetermined direction is the direction of the Y-axis and the distance from said diffraction grating unit to said object is defined as WD and the angle of diffraction in said direction of the x-axis by said diffraction grating is defined as $\theta$, the hyperbola of said grating rows is represented by the following expression:

$$(x+WD/\tan\theta)^2/(WD/\tan\theta)^2 - y^2/WD^2 - 1 = 0.$$

* * * * *

UNITED STATES PATENT AND TRADEMARK OFFICE
CERTIFICATE OF CORRECTION

PATENT NO.    : 6,259,531 B1
DATED         : July 10, 2001
INVENTOR(S)   : Makoto Takamiya et al.

Page 1 of 1

It is certified that error appears in the above-identified patent and that said Letters Patent is hereby corrected as shown below:

<u>Column 1,</u>
Line 27, "moving object." (2nd occurrence) should be deleted.

<u>Column 2,</u>
Line 16, "±first-order" should read -- ±First-order --.
Line 18, "when" should read -- When --.

Signed and Sealed this

Twenty-eighth Day of May, 2002

Attest:

*Attesting Officer*

JAMES E. ROGAN
*Director of the United States Patent and Trademark Office*